United States Patent
Goutam

(10) Patent No.: US 9,448,907 B2
(45) Date of Patent: *Sep. 20, 2016

(54) COMPUTER APPLICATION MATURITY ILLUSTRATION SYSTEM WITH SINGLE POINT OF FAILURE ANALYTICS AND REMEDIATION TECHNIQUES

(71) Applicant: Bank of America Corporation, Charlotte, NC (US)

(72) Inventor: Gandhi Goutam, Richmond, VA (US)

(73) Assignee: Bank of America Corporation, Charlotte, NC (US)

( * ) Notice: Subject to any disclaimer, the term of this patent is extended or adjusted under 35 U.S.C. 154(b) by 130 days.

This patent is subject to a terminal disclaimer.

(21) Appl. No.: 14/064,184

(22) Filed: Oct. 27, 2013

(65) Prior Publication Data

US 2015/0121154 A1    Apr. 30, 2015

(51) Int. Cl.
*G06F 11/00* (2006.01)
*G06F 11/34* (2006.01)
*G06F 11/32* (2006.01)
*G06Q 10/00* (2012.01)

(52) U.S. Cl.
CPC ......... *G06F 11/3409* (2013.01); *G06F 11/008* (2013.01); *G06F 11/321* (2013.01); *G06Q 10/00* (2013.01); *G06F 2201/81* (2013.01)

(58) Field of Classification Search
CPC .................................................. G06F 11/323
See application file for complete search history.

(56) References Cited

U.S. PATENT DOCUMENTS

| | | | |
|---|---|---|---|
| 7,617,254 B2* | 11/2009 | Loaiza et al. | |
| 7,624,443 B2* | 11/2009 | Kramer et al. | 726/22 |
| 2005/0076262 A1* | 4/2005 | Rowan et al. | 714/6 |
| 2006/0074993 A1* | 4/2006 | Pulamarasetti et al. | 707/200 |
| 2013/0006941 A1* | 1/2013 | Asakura et al. | 707/648 |

* cited by examiner

*Primary Examiner* — Christopher McCarthy
(74) *Attorney, Agent, or Firm* — Weiss & Arons LLP; Michael A. Springs, Esq.

(57) ABSTRACT

An application maturity illustration system is provided. Such a system may determine a maturity of a computer application, and display same. The determination may include determining an inventory score, an operational status, a management score reflective of a ratio of an actual management value to a desired management value, a risk score and a future score for the computer application. The future score may be reflective of a projected relative importance of the computer application. The processor may operate to display a GUI that includes inventory score, operational status score, management score, risk score and the future score in a horizontal row. The vertical column may be located either along the top most portion of the GUI with respect to a user viewing the GUI or at the bottom most portion of the GUI with respect to a user viewing the GUI. The GUI may also be configured to display a recovery exercise date region. The recovery exercise date region may be color-coded.

16 Claims, 8 Drawing Sheets

| ENTER APPLICATION INFORMATION NUMBER |
|---|
| 11697 |

702

| YEAR 2013 |
|---|
| Current Year HotP Maturity Calculation Pulled From Data Sheet. Validate With Recent Placemat And Update Data If Required. |

706

| APPLICATION NAME | | | | | |
|---|---|---|---|---|---|
| | | | DATE UPDATED | | AUG-13 |
| D | 32 | NP | 6 | RESILIENCY | |
| TOTAL PROD+32 | | 92 | | HOT / WARM | |
| TIX / YR (P1, P2, ALL, CARs) | | 8959 | 289 | DATA CENTERS | |
| 352 | 62 | | | PROD | RVA, RTX |
| AVAIL % | | 92.90% | | DR | RVA, RTX |
| RTO | TIER 1 / UP TO 1 HOUR | | | NON PROD | CON, CHR, |
| RTC | 00:05 | RE DATE | 5/24/203 | CHANGE RATE (MIN/AVG/MAX) | 32 / 45.2 / 64 |
| RPO | TIER 2 / CLOSE TO ZERO | | | RISK | FUTURE |
| MATURITY | INV | STATUS | MGMT | | 3 |
| | 2 | 2 | 2 | 2 | |

COMPUTER APPLICATION MATURITY ILLUSTRATION SYSTEM WITH SINGLE POINT OF FAILURE ANALYTICS AND REMEDIATION TECHNIQUES

FIELD OF TECHNOLOGY

This invention relates to a tool for use in tracking a computer application's maturity. Specifically, this invention relates to presenting informative snapshots of an application's maturity.

BACKGROUND OF THE DISCLOSURE

Many entities depend heavily on their information technology ("IT"). IT must be maintained and supported.

The backbone of IT is the software and hardware associated with various computer applications. Software and hardware performance, and resource consumption, matures and changes over time.

It would be desirable for an entity to provide systems for providing baseline measurements and assessments of end-to-end flow of a software and/or hardware application.

It would also be desirable to improve IT stability and availability over the life cycle of applications.

It would be yet further desirable to use historic trends to forecast future application issues and, where possible, to ameliorate the issues on a go-forward basis.

It would be still further desirable to present analyses based on the foregoing in a graphical user interface ("GUI") that is both informative and compact.

SUMMARY OF THE DISCLOSURE

Systems and methods for electronically displaying a pictorial, preferably color-coded, view of IT maturity and/or end-to-end information flow are provided.

The embodiments may include an article of manufacture including a non-transitory computer usable medium having computer readable program code embodied therein. The code, when executed by a processor, may cause a computer to assess and display the maturity of a computer application.

The computer readable program code in the article may include computer readable program code, which, when executed by the processor, determines a maturity of a computer application. The maturity determination may include determining an inventory score reflective of the number of computer application that are presently in use by an entity; an operational status score of the computer application and a management score for the computer application. The management score may reflect a ratio of an actual management value to a desired management value.

The maturity determination may include a risk score for the computer application. The risk score may reflect a risk to the entity associated with the computer application. The maturity determination may include a future score for the computer application. The future score may reflect a projected relative importance of the computer application.

The computer readable program code, when executed by the processor, may display a GUI that includes the inventory score, the operational status score, the management score, the risk score and the future score in a horizontal row. The horizontal row may be located either along the top most portion of the GUI with respect to a user viewing the GUI or at the bottom most portion of the GUI with respect to a user viewing the GUI. The GUI may also be configured to display a recovery exercise date region.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 7 shows an illustrative schematic design of yet another GUI which embodies systems and methods according to the invention.

DETAILED DESCRIPTION OF THE DISCLOSURE

Figure 1:
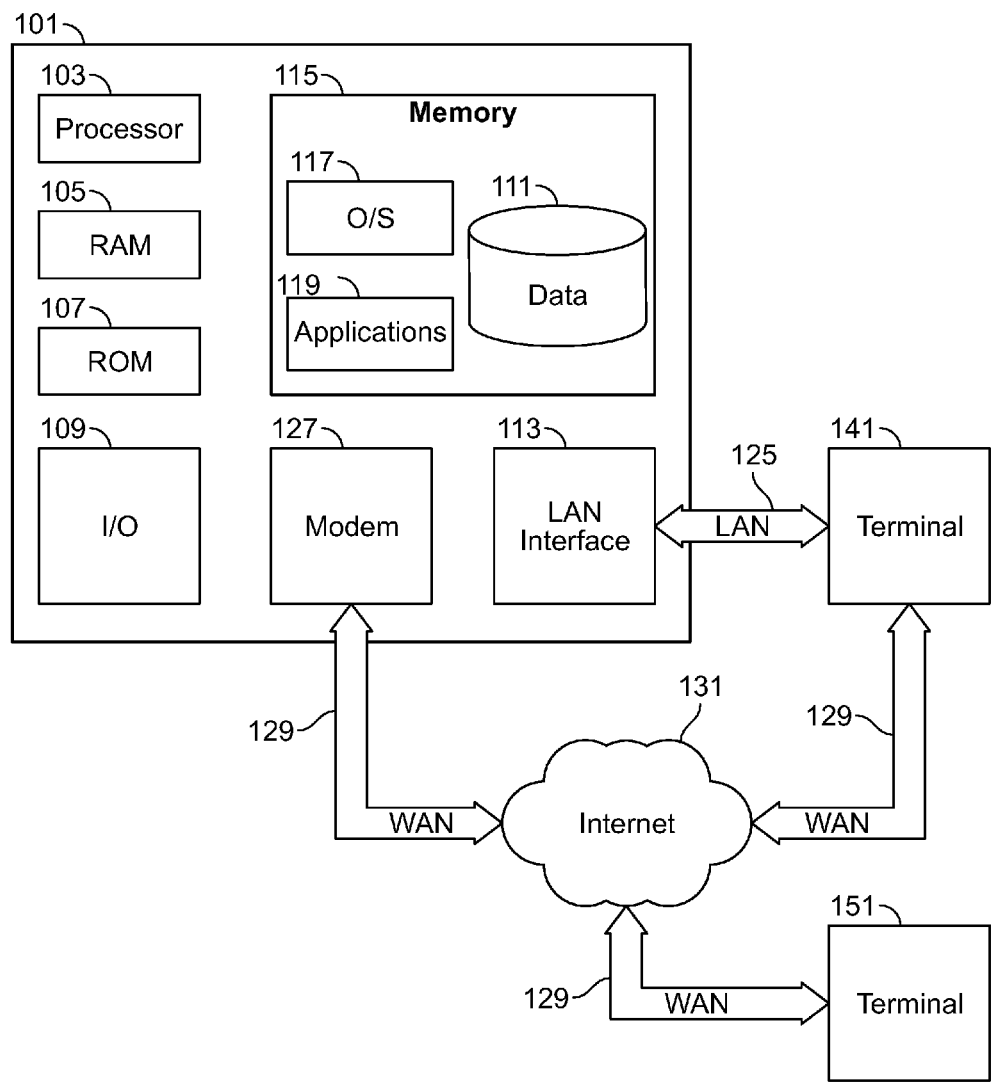
FIG. 1 shows apparatus that may be used in accordance with the systems and methods of the invention.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art upon reading the following disclosure, an application maturity illustration system may be embodied as a method, a data processing system, or a computer program product. Accordingly, an application maturity illustration system may take the form of an entirely hardware embodiment, an entirely software embodiment or an embodiment combining software and hardware aspects.

Furthermore, an application maturity illustration system may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In an exemplary embodiment, in the event that an application maturity illustration system is embodied at least partially in hardware, the application maturity illustration system may include one or more databases, receivers, transmitters, processors, modules including hardware and/or any other suitable hardware. Furthermore, the operations executed by the application maturity illustration system may be performed by the one or more databases, receivers, transmitters, processors and/or modules including hardware.

For some embodiments, data for the application maturity system may be retrieved from a number of distinct computer report files.

One report that may be used to generate data for the application maturity system may be a corrective action records ("CARs") report. A CARs report typically provides information regarding the actions taken to resolve incidents.

Such a report may preferably be run with a date filter to obtain data for a certain pre-determined window of time. Such a report may also preferably include a "problem affected" filter. The "problem affected" may preferably allow a user to filter the corrective action records based one or more selected types of corrective actions.

Once the report has completed, data can be exported to a suitable file. Such a format for a suitable file may include a Microsoft Excel™ format, which is manufactured by Microsoft™ of Redmond, Wash.

Such a report may include, for each corrective action identified, a problem start time, a problem end time, a problem duration time, a problem ID, a problem severity, a problem priority and/or a magnitude of business impact of the problem.

Another report that may be used to generate data for the application maturity system may be a data inventory ("DI") report. Such a report may preferably be run with a data filter to obtain data for certain pre-determined DI attributes, DI metrics and/or DI filters.

Once the DI report has completed, DI data can be exported to a suitable file. Once the data has been exported to a suitable file, such as an Excel-formatted file, it can be stored for population of the application maturity system GUI.

Such a report may include, for example, server status information.

Another report that may be used to generate data for the application maturity system may be an incident report—i.e., a report that includes application device failures, complaints and/or service calls. Typically, when such incidents occur, a solution is applied and the incident is closed.

Such a report may preferably be compiled using a data filter to obtain data for an incident priority, an incident impact, an incident ticket ID, an incident associated problem, an incident actual start time, an incident actual finish time, an incident severity and/or any other suitable incident information.

The incident report may be generated for one or more of a number of incident metrics. Such metrics may include incidents that occurred in certain date ranges such as incidents that include an age of 3 to 7 days, 7 to 14 days, 14 to 31 days, 31 to 62 days, greater than 62 days, or in some other suitable time range.

Also included in the incident report may be data related to the amount of time necessary to manage and/or resolve the incident.

Another report that may be used to generate data for the application maturity system may be an ad hoc change report. Such a report may preferably be run with application change information. Such application change information may include the e-mail address of the person responsible for the change, actual start time of the change, actual finish time of the change, the change record count, the percent successful change, the number of successful changes and the total number of application changes.

Yet another report that may be used to generate data for the application maturity system may be a business continuity extract report. Such a report may preferably be run to obtain information regarding the business continuity as it relates to the application maturity information.

FIG. 1 is a block diagram that illustrates a generic computing device 101 (alternately referred to herein as a "server") that may be used according to an illustrative embodiment of the invention. The computer server 101 may have a processor 103 for controlling overall operation of the server and its associated components, including RAM 105, ROM 107, input/output module ("I/O") 109, and memory 115.

I/O module 109 may include a microphone, keypad, touch screen, and/or stylus through which a user of server 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 111. Alternately, some or all of server 101 computer executable instructions may be embodied in hardware or firmware (not shown). As described in detail below, database 111 may provide storage for information input into to implement an application maturity illustration system.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network ("LAN") 125 and a wide area network (WAN) 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages via the World Wide Web from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

A terminal such as 141 or 151 may be used by a user of an application maturity illustration system to view, and/or review, the number of historical (and/or projected) incidents relating to a specific application, the rate of change of incidents on a week-to-week, month-to-month, year-to-year, or other suitable amount of time, basis, compliance with relevant regulations, affect on entity reputation and/or continuous improvement recommendations. Information input for use with an application maturity illustration system may be stored in memory 115. The input information may be processed by an application such as one of applications 119.

Figure 2:
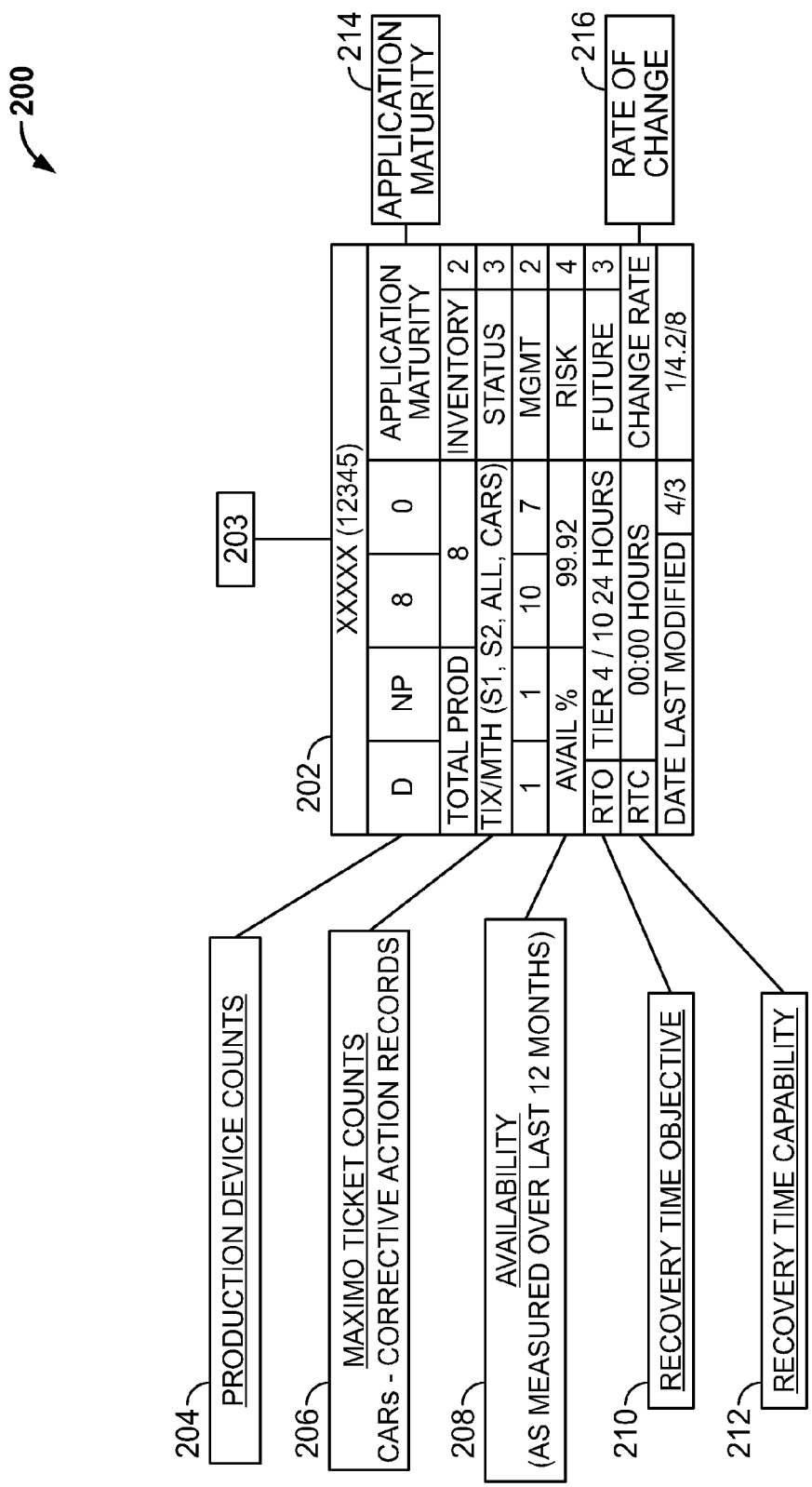
FIG. 2 shows an illustrative schematic diagram of a GUI which embodies systems and methods according to the invention.

FIG. 2 shows an illustrative GUI 200 for use with certain embodiments. GUI 200 may include a name region 202. Name region 202 may include service group information. Service group information may indicate which sub-entity, within the greater entity, is tasked with maintenance and support of the application. In certain embodiments, region 202 may also include a short name for referring to the application described in the GUI. Region 202 may also include a longer, more detailed, name for referring to the application.

GUI 200 may also include a device count indicator 204. Device count indicator 204 may include an indication of declining device ("D")—e.g., a device that exhibits greater than a threshold amount of incidents (including device failures, complaints, service calls, etc.) during a pre-determined time period. Device count indicator 204 may include an indication of not permitted devices ("NP")—e.g., a device that does not include device characteristics such as processor speed, computer memory, etc., sufficient to satisfactorily support the application. Not permitted devices may include devices that are currently in use by the application but that are substantially incompatible with the application. Device count indicator 204 may also include total products ("TP") which represents the total number of devices currently in use with the application.

GUI 200 may also include an incident count provider 206. Such an incident count provider may preferably provide counts corresponding to a predetermined period of time. For example, incident count may preferably indicate the number of complaints, service calls, or other similar occurrences that have happened over a predetermined time period. Such an incident count provider may preferably provide counts corresponding to various severity levels of incidents. Such incidents may be recorded using asset lifecycle and maintenance management software, such as IBM Maximo Asset Management software which is manufactured by IBM headquartered in Armonk, N.Y.

For example, incident count provider 206 may provide incidents of a first severity level. Incident count provider 206 may provide incidents of a second severity level. The first severity level may correspond to a relatively lower level of seriousness than the second severity level. The first severity level may correspond to a relatively higher level of incident seriousness than the second severity level.

Incident count provider 206 may provide a total value of all incidents over the predetermined period of time. The total value of incidents may correspond to the sum of the first level incidents and the second level incidents over the predetermined period of time. Incident count provider 206 may also provide a total number of CARs. Equation 1 shows an exemplary equation for determining the average monthly number of incidents when taken over an exemplary time period of one year.

$$\overline{I_{total}} = \frac{\left(\sum_{n=1}^{12} I_{level1}(n) + I_{level2}(n)\right)}{12}$$ Equation 1

$\overline{I_{total}}$=Average number of incidents per month
$I_{level\ 1}$=Number of Incidents of a first severity level
$I_{level\ 2}$=Number of Incidents of a second severity level It should be noted that Equation 1 may preferably be scalable by adding one or more additional incident severity levels, represented by $I_{level\ t}$ which may preferably be at a different level of severity than $I_{level\ 1}$ and/or $I_{level\ 2}$.

GUI 200 may also include an availability indicator 208 as measured over a predetermined period of time. Such a measure of availability may include, for example, the amount of time the application was in service on any of the hardware, or on all of the hardware, or on some percentage of the hardware, over a pre-determined period of time such as 12 months.

GUI 200 may also include a recovery time objective indicator 210. Recovery time objective indicator 210 may preferably indicate a class of application, such as a tier, and a baseline amount of recovery time from an incident, as defined above. The baseline recovery time associated with the tier may preferably form a threshold expected level of recovery time for software and/or hardware associated with such an application.

GUI 200 may also include a recovery time capability indicator 212. Recovery time capability indicator 212 may indicate a baseline amount of potential recovery time which the application may withstand. Such a baseline amount of recovery time objective may be weighted based on certain factors. Such factors may include whether the application is customer-facing (which would have an inverse relationship with the recovery time because an increase in the customer-facing characteristic of the application tends to increase the importance of the application, thereby reducing the recovery time objective), the criticality of the application to the work flow of the entity (which also may tend to have an inverse relationship with the recovery time objective), and/or any other suitable factor.

GUI 200 may also include an application maturity indicator 214. Maturity indicator 214 may include different scored categories. Such scored categories may include inventory, status, management, risk, and future. Inventory may correspond to a score which reflects a total inventory of hardware that currently runs the application with respect to a desired inventory that may preferably be implemented to run the application. Status may correspond to a score which reflects a current operational state of the application with respect to a desired operational state of the application. Status may correspond to a ratio of a current operational state of the application to a fully-functional operational state of the application.

Management score may correspond to a score which reflects the current number of deployed managers that are responsible for the application with respect to a desired level of deployed managers that are responsible for the application.

Risk score may correspond to a score which reflects the level of risk to the entity associated with the application. Such a level of risk to an entity may depend on a series of factors.

Table 1 (below) shows an exemplary list of risk factors, and the relative weight of the factors with respect to one another, which may be used to determine a risk score. This list of risk factors, as well as any other suitable risk factors, may be used in formulating a risk score for use in the maturity indicator.

TABLE 1

Exemplary Risk Factors

| Risk Factors | Exemplary Weight (1-5) |
|---|---|
| Customer Facing | 5 |
| Located on Entity Critical Path | 5 |
| Geographic Location | 4 |
| Technology Investment | 3 |

Future may correspond to the relative importance of the application going forward. Such a metric may preferably be obtained by determining a baseline value of the application to the entity prior to a predetermined historic period. Thereafter, a trend reflecting the future value to the entity may be determined.

In some embodiments, Future may correspond to whether the slope of the value of the application to the entity is a positive slope or a negative slope. In some embodiments, Future may further correspond to the absolute magnitude of the positive slope or the negative slope.

The future value to the entity may be determined by one or more metrics. Such metrics may include the amount of revenue produced by the application, the percentage of personnel within the entity that use of the application, whether the application is customer-facing or any other metric that helps determine the value of the application to the entity.

GUI 200 may also include a rate of change indicator 216. Rate of change indicator 216 may preferably indicate one or more measured rates of changes made to the application over a predetermined time period. Such changes may include software or hardware patches released for the application, new versions of the application, or any suitably substantive changes made to the application.

It should be noted that a relatively high rate of change may indicate that there is a risk item associated with the application.

Rate of change indicator 216 may show a minimum rate of change over a predetermined time period. The minimum rate of change may indicate the least changes in any single month during the most recent 12 month period.

Rate of change indicator 216 may show an average rate of change over a predetermined time period. The average rate of change may include an average monthly rate of change during the most recent 12 month period.

Rate of change indicator 216 may show a maximum rate of change over a predetermined time period. The maximum rate of change may indicate the most changes in any single month during the most recent 12 month period.

Such an exemplary GUI 200 may indicate a number of important points regarding an application maturity. For example, GUI 200 may indicate a relatively high rate of change, which suggests application instability. GUI 200 may indicate a low availability based on the high number of incidents. GUI 200 may indicate a declining infrastructure, though not yet out-of-support. GUI 200 may indicate high repair call (referred to hereinafter as "high ticket") counts, especially severity three. In view of the foregoing, GUI 200 may generally indicate a low maturity—i.e., still not fully developed, or past the prime development status—infrastructure.

In certain embodiments, one or more of the indicators in FIG. 2 may be color-coded. The color coding may be based, in certain embodiments, on the score indicated by the indicators. Thus, a relatively low score, which, in certain embodiments, may indicate a high level of risk associated with the application, may be displayed with a red background. A relatively high score, which, in certain embodiments, may indicate a low level of risk associated with the application, may be displayed with a green background. Other suitable colors may also be used, either to show relatively low or high risk scores, or to show some other score that corresponds to another level of risk. In certain embodiments, certain colors, or combinations of colors, may be used to indicate a plurality of criteria such as high levels of risk and poor management, well-stocked inventory but poor future value to the entity, etc.

The score for inventory may be obtained using an algorithm. The algorithm may be based on answers to one or more questions. The answers to one or more of the questions may be weighted. The result of the algorithm may be normalized to obtain a score of between 1 and 5, where a score of 1 may indicate a requirement for a reaction to the score, a score of 2 may indicate an emerging risk, a score of 3 may indicate an improving situation, a score of 4 may indicate a managed risk and a score of 5 may indicate an optimized situation. Also, with respect to each of the individual scores, each one of 1-5 scores, or 0-5 scores, may indicate a unique condition.

Examples of questions that may be used for input into an algorithm relating to inventory may include the following exemplary questions. Such questions may be answered by suitable IT, or other, personnel within the entity. However, the answers to the questions may, for the most part, preferably be objective answers, and not dependent on one or more subjective interpretations of facts.

TABLE 2

Exemplary Inventory Questions

| Exemplary Questions | Exemplary Weight (1-5) |
|---|---|
| Are the processes in place (e.g., maintenance, periodic purchase of new inventory, etc.) to continue to maintain current inventory? | 5 |
| Is inventory adequately supported? | 4 |
| What are service level agreements ("SLAs") inventory? | 3 |

Equation 2 shows an exemplary equation for determining a total inventory score in response to the answers to the questions obtained in an inventory query process.

$$S_{inventory} = \frac{\left(\sum_{1}^{n} T(n)\right)}{n}$$

Equation 2

$S_{inventory}$=Score of inventory
$T(n)$=Response to query; and
$n$=individual query number.

Inventory scores, following normalization from 0-5, may indicate the following, as shown in Table 3.

| Inventory - what do you have? | Score (0-5) |
|---|---|
| No Inventory | 0 |
| Unreliable inventory | 1 |
| Reliable "pockets" of inventory and processes; emerging inventory management practices | 2 |
| Depth and quality of information being maintained and utilized materially improving | 3 |

-continued

| Inventory - what do you have? | Score (0-5) |
|---|---|
| Fully integrated, system-based inventory; mature inventory management practices in place and being used | 4 |
| Process cross checks affirm inventory; modeling utilized | 5 |

Examples of questions that may be used for input into an algorithm relating to status may include the following exemplary questions.

TABLE 4

Exemplary Status Questions

| Exemplary Questions | Exemplary Weight (1-5) |
|---|---|
| How is inventory currently performing? | 5 |
| What is operational status of inventory? | 5 |

Status scores, following normalization from 0-5, may indicate the following, as shown in Table 5.

| Status - what is happening to the inventory? | Score (0-5) |
|---|---|
| No Idea | 0 |
| Short term, reactive understanding of performance | 1 |
| Data collections, metrics gathering, and exposure identification processes emerging | 2 |
| Understanding of patch and moderate term needs; Tier 1 elements current | 3 |
| Near real time understanding of usage; Tier 2 elements substantially current | 4 |
| Modeling based on historical data and what if capabilities | 5 |

Equation 3 shows an exemplary equation for determining a total status score in response to the answers to the questions obtained in a status query process.

$$S_{status} = \frac{\left(\sum_{1}^{n} T(n)\right)}{n} \quad \text{Equation 3}$$

$S_{status}$=Score of status

T(n)=Response to query; and n=individual query number.

Examples of questions that may be used for input into an algorithm relating to management may include the following exemplary questions.

TABLE 6

Exemplary Management Questions

| Exemplary Questions | Exemplary Weight (1-5) |
|---|---|
| What level is the skill set of the managers that support the application? | 5 |
| How well is failure managed? | 4 |
| How well are incidents/issues communicated? | 3 |
| Rate the recovery time and the backlog? | 5 |

Management scores following normalization from 0-5, may indicate the following, as shown in Table 7.

| Management - what do you have? | Score (0-5) |
|---|---|
| Un-managed | 0 |
| Inconsistent support and escalation processes; teams segmented; reactive | 1 |
| Standard support and escalation model emerging; silos of standardization deployed | 2 |
| Management model improving; standard tools and exception management | 3 |
| Management processes and tools fully deployed and stabilized | 4 |
| Optimized management processes and tools; continuous improvement leveraged | 5 |

Equation 4 shows an exemplary equation for determining a total management score in response to the answers to the questions obtained in a management query process. Although the management score may be divided by a desired management score ("DMS") to obtain a ratio, nevertheless, the ratio may be normalized to conformed the total management score to the other scores. For example, $S_{management}$ may be multiplied by 5 to obtain a score that conforms to the other scores, but maintains the ratio of the information contained in the score, as derived from the query responses, to the DMS.

$$S_{management} = \left(\frac{\left(\sum_{1}^{n} T(n)\right)}{n}\right) / DMS \quad \text{Equation 4}$$

$S_{management}$=Score of management

T(n)=Response to query;

DMS=Desired Management Score and n=individual query number.

Examples of questions that may be used for input into an algorithm relating to risk score may include the following exemplary questions.

TABLE 8

Exemplary Risk Questions

| Exemplary Questions | Exemplary Weight (1-5) |
|---|---|
| How is single failure point managed? | 5 |
| What kind of failsafe processes are in place to identify problems and root causes? | 4 |
| What are processes currently in place to pro-actively identify risk? | 3 |
| What are processes currently in place to pro-actively identify risk factors? | 5 |

Risk scores, following normalization from 0-5, may indicate the following, as shown in Table 9.

| Risk - what risks exist? | Score (0-5) |
|---|---|
| Unknown | 0 |
| Reactive, problem and incident based risk management; Inconsistent analysis and processes | 1 |
| Emerging risk management techniques and processes; material risks accounted for | 2 |
| Improving risk management; metrics gathering and analysis; automation for some data gathering | 3 |
| Cohesive, integrated technology and business risk management | 4 |
| Predictive modeling and industry best practices used to optimize processes | 5 |

Equation 5 shows an exemplary equation for determining a total risk score in response to the answers to the questions obtained in a risk query process.

$$S_{risk} = \frac{\left(\sum_{1}^{n} T(n)\right)}{n}$$

Equation 5

$S_{risk}$=Score of risk
T(n)=Response to query; and
n=individual query number.

Examples of questions that may be used for input into an algorithm relating to application future may include the following exemplary questions.

TABLE 10

Exemplary Future Questions

| Exemplary Questions | Exemplary Weight (1-5) |
|---|---|
| Understand future needs? | 5 |
| Clear roadmap to meet future needs? | 4 |
| Customer's future needs - how well is the application prepared to meet the future needs? | 3 |
| Future technology needs - how well is the application able to meet the future technology evolution? | 5 |

Future scores, following normalization from 0-5, may indicate the following, as shown in Table 11.

| Future - what is the application's future? | Score (0-5) |
|---|---|
| No strategy or planning | 0 |
| Islands of strategy and planning | 1 |
| Emerging infrastructure maturity and business solution roadmaps; progress emerging | 2 |
| Standardized strategy and planning with 12-18 month focus; improving track record | 3 |
| Rolling strategy 18-24 months out and planning with feedback and refinement aligned with business | 4 |
| Modeling 24-36 months out against technology, product, acquisition scenarios | 5 |

Equation 6 shows an exemplary equation for determining a total future score in response to the answers to the questions obtained in a future query process.

$$S_{future} = \frac{\left(\sum_{1}^{n} T(n)\right)}{n}$$

Equation 6

$S_{future}$=Score of future
T(n)=Response to query; and
n=individual query number.

While exemplary algorithms have been set forth above to show possible processes for determining scores for factors such as inventory, status, management, risk and future, it should be noted that other factors may be examined in determining the health of an application. It should also be noted that certain of the query responses may be weighted in order to put additional emphasis on certain aspects of one or more particular factors.

Certain rules may be implemented in conjunction with the application maturity system. Such rules may be implemented in conjunction with a rules database.

Such rules may be implemented as follows. In certain embodiments, reports such as the reports described above, including but not limited to the CARs report, the DI report, the incident report, the ad hoc report and/or the business continuity extract report may provide data. Such data may be used to indicate "not permitted" values, availability values, RTC information, etc.

For example, application status may show a red color if a "not permitted" value, as derived from the report data, is a value greater than zero, if application availability is less than 0.98 or if RTC is greater than the established tier range, as set forth in more detail below. Application status may show a yellow color if a "not permitted" value is a value equal to zero, if availability is between 0.98 and 0.999 or RTC is less than the established tier range. Application status may show a green color if a "not permitted" value is a value equal to zero, if availability is greater than or equal to 0.999 or RTC is less than the established tier range.

In one embodiment, devices associated with an application that score less than 1 on a predetermined scale of device operational status, but greater than 0 on the pre-determined scale may display a yellow color in the status region associated with the devices. Devices that score greater than 1 may display a red color as not permitted technology.

Device and/or application availability rules may include the following: a green color may be displayed for application availability that is greater than or equal to 0.999; a yellow color may be displayed for availability that is between 0.98 and 0.999; and a red color may be displayed for availability that is less than 0.98. In one embodiment, device availability may be determined by the following calculation, (minutes per year)−(P1 and P2 Incident duration with client impact)/(minutes per year.)

In certain embodiments, a recovery exercise date region, explained in more detail below with respect to element 524 of FIG. 5, may display a red color for a value greater than 12 months.

Figure 3:
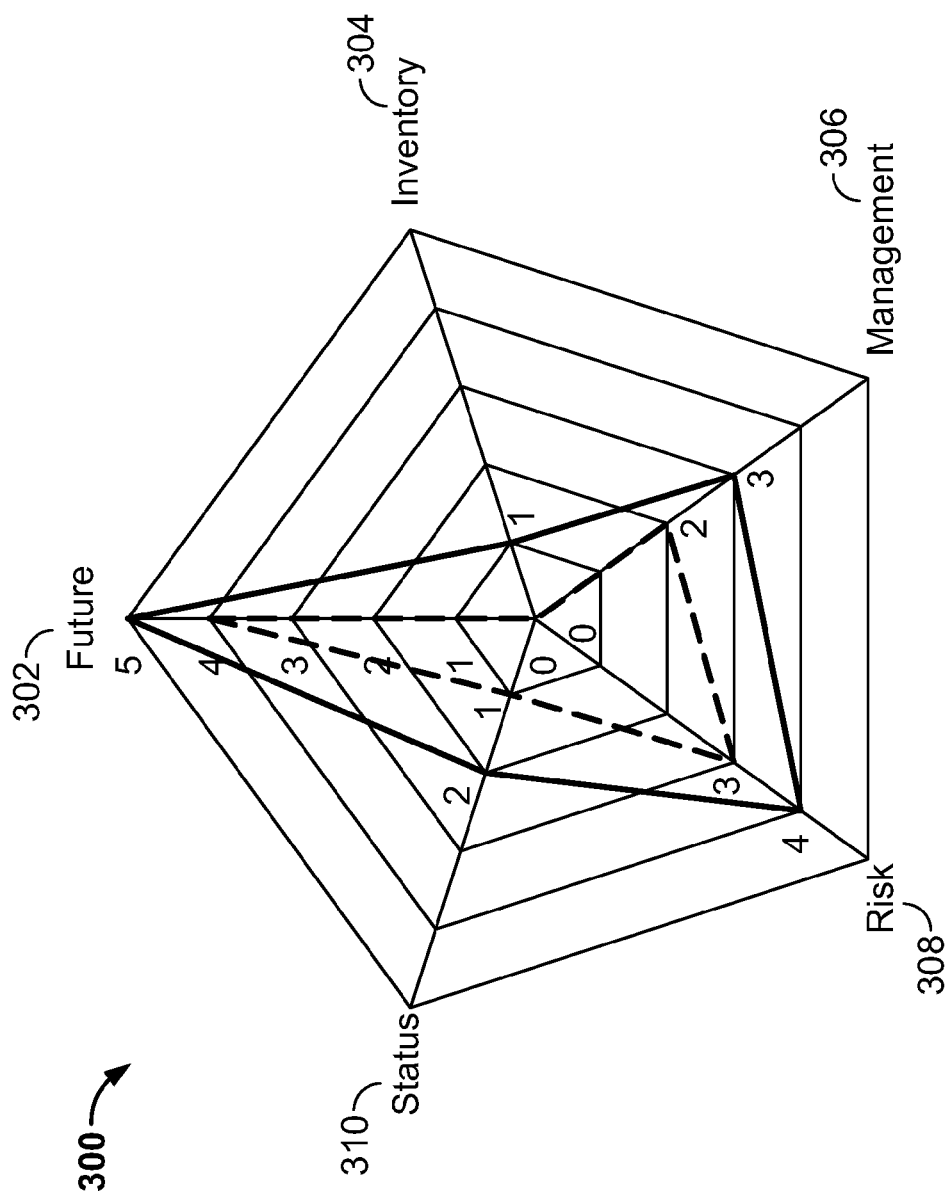
FIG. 3 shows a schematic diagram of an illustrative chart which may be used with systems and methods according to the invention.

FIG. 3 shows an illustrative spider chart 300 of embodiments. In one embodiment, shown as an unbroken line, chart 300 shows a distribution of present scores of maturity factors: inventory 304, management 306, risk 308, status 310 and future 302. Broken line shows a possible target embodiment (where 1 is the highest score and 5 is the lowest score.) Spider chart 300 shows an exemplary embodiment of one illustrative chart that a visual indication of the relative application maturity with respect to a target level of application maturity.

Figure 4A:
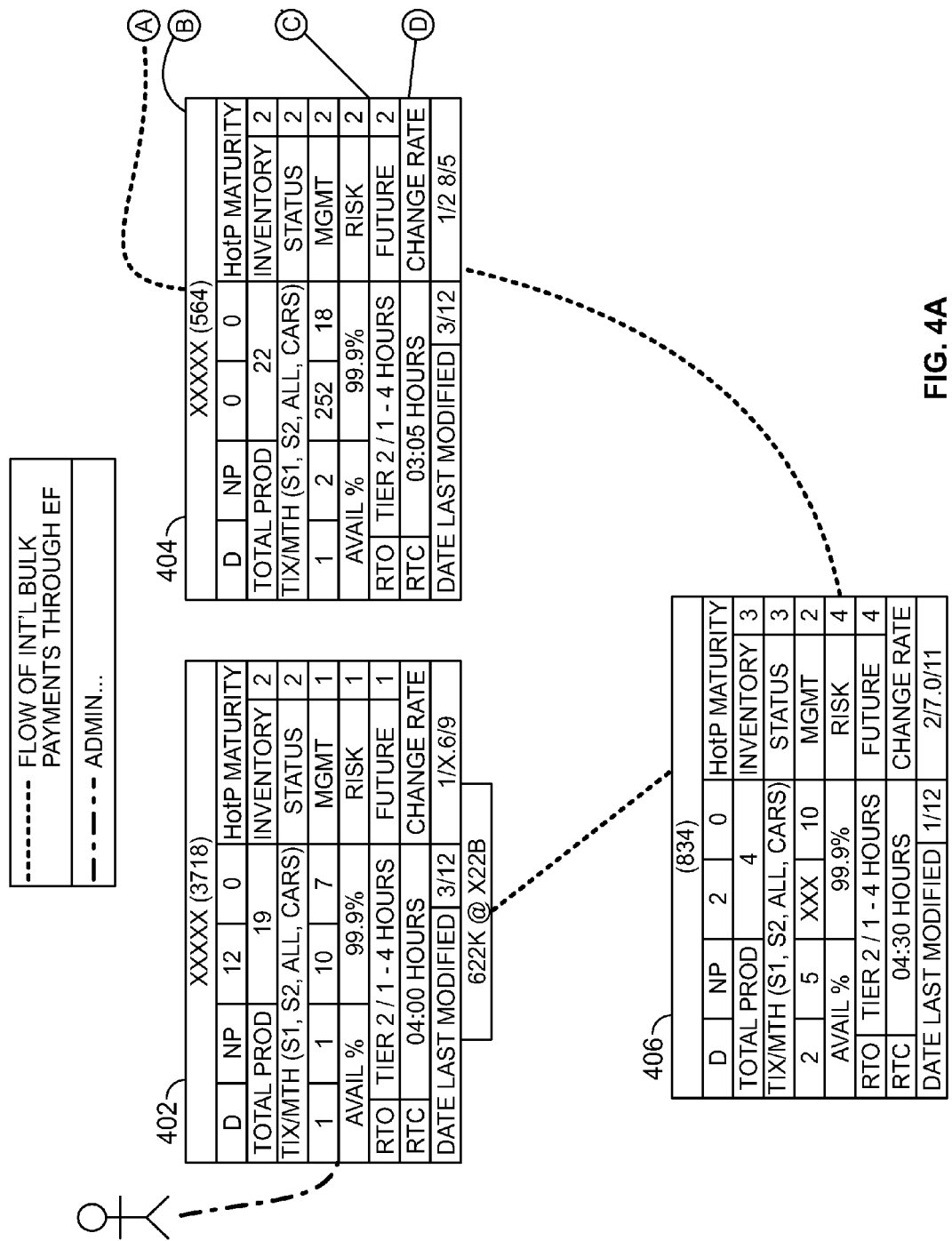
FIGS. 4A and 4B show an illustrative schematic diagram including a plurality of GUIs of the type shown in FIG. 2.
Figure 4B:
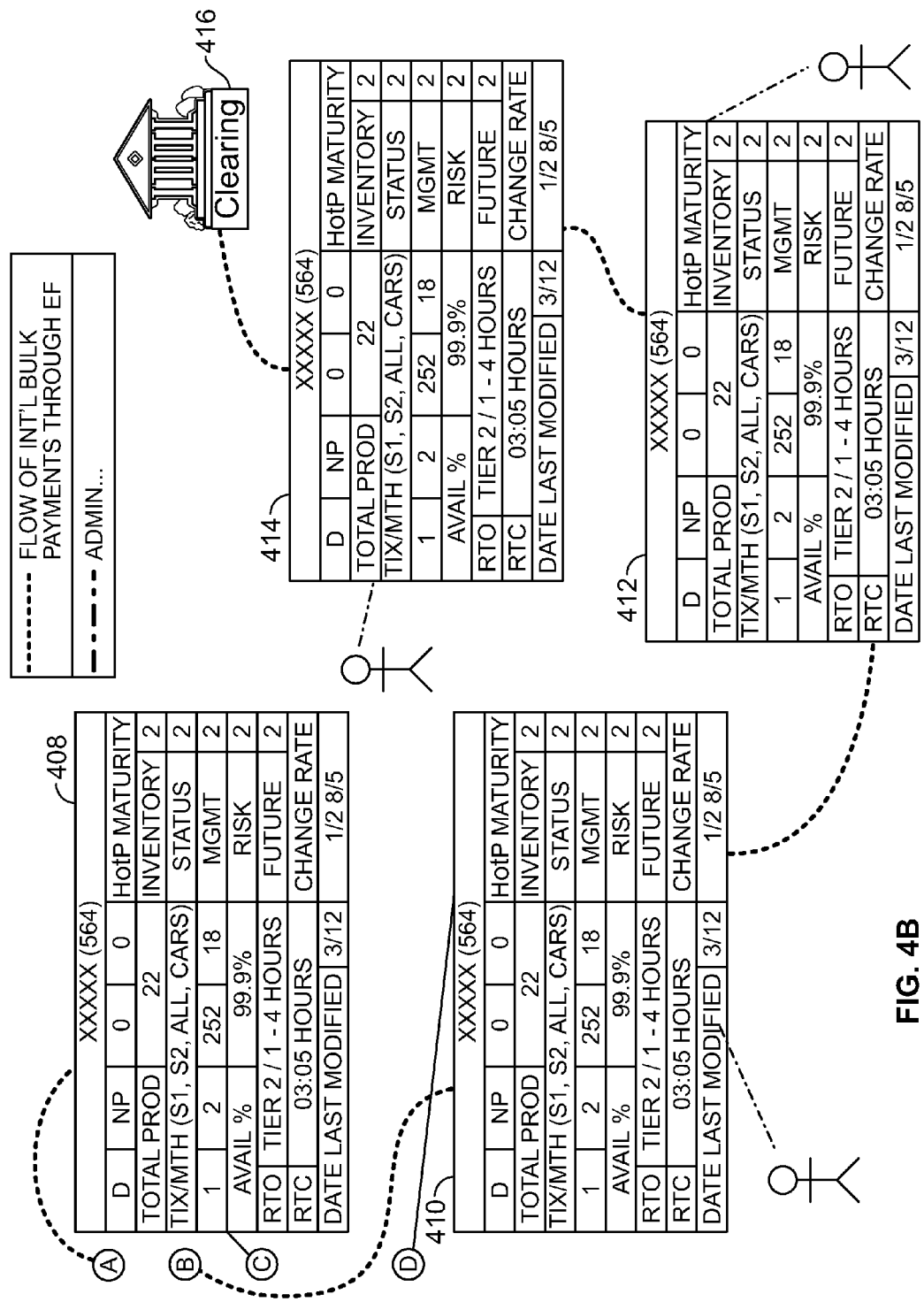

FIGS. 4A and 4B show a plurality of exemplary linked application maturity GUIs 402-414. A plurality of exemplary linked application maturity GUIs 402-414 preferably depicts the critical path for an exemplary client action. Such an action may include, for example, performing a bulk transfer of funds to an international location. FIG. 4B shows clearing house 416 for clearing of such a transfer. While each of GUIs 402-414 comprises a tier 2/1-4 RTO, it should be noted that different applications along the same path may, at times, have different tiers and/or RTO objectives.

Accordingly, a GUI of the entity may be logged into via a workstation, at 402. Preferably, the client may initiate a wire transfer for an international bulk payment and have it fully executed and cleared via the applications shown illustratively in FIG. 4A and FIG. 4B. Application 404 may be a front end for sending payment and/or a file delivery application. Application 406 may be a security check application that initiates and/or validates payment. Applications 408-412 may represent various applications. Each of applications 408-412 may check with requirements for international transfer of bulk payments. Such requirements may depend on the final destination of the payments—e.g., Europe, Asia, Africa, etc. Each of applications 408-412 may, depending on the final destination of the payments, prepare payment for transfer to appropriate clearing. Such clearing may occur at clearing house 416.

Application 414 may, in the exemplary embodiment described above, put the payment in a log and configure the payment with the appropriate SWIFT Alliance information, or other suitable banking information transfer information. Such information may preferably route the payment to the appropriate parties in a manner accepted by the countries and/or financial institutions. The joining of the applications represents a possible critical path of the information as it passes end-to-end from the first application, in which the logging occurs, to the clearing.

One advantage of exemplary embodiments shown in FIGS. 4A and 4B is that showing an individual GUI for each application may preferably allow a user to quickly and easily appreciate the condition of an entire pathway.

For example, a certain application may be a tier 1 application—i.e., an application that requires an active live system and synchronous replication in a back-up system. Nevertheless, the certain application may lie along a critical path with a tier 2 application, which may include a back-up system that is only substantially current and not synchronously replicative of the live system. As such, the attributes of the certain application are throttled down to the attributes of the tier 2 application. This limits the performance of the certain application to a sub-optimal level. Exemplary embodiments shown in FIGS. 4A and 4B may quickly and easily detect and display such a sub-optimal application arrangement.

Figure 5:
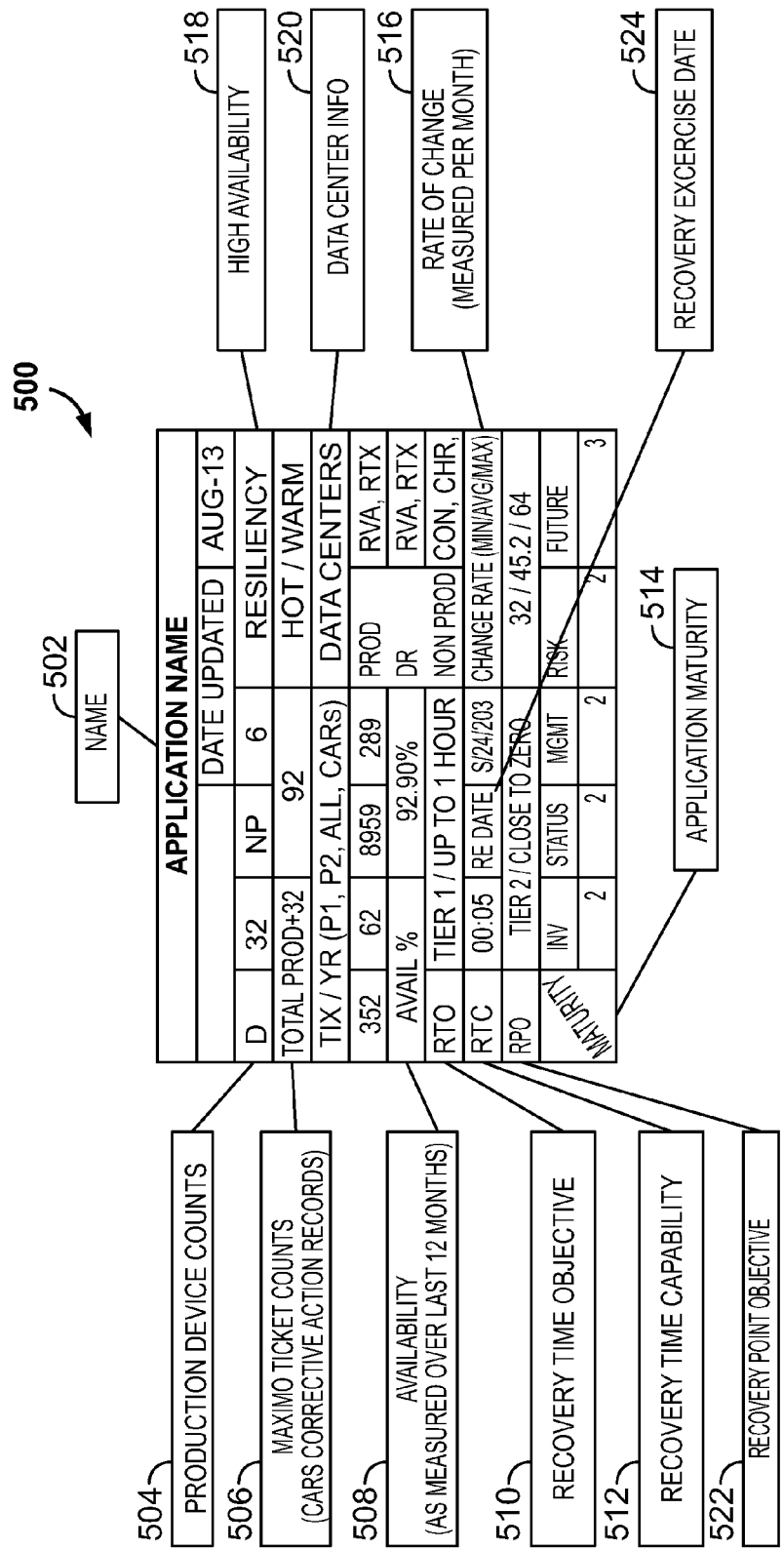
FIG. 5 shows an illustrative schematic diagram of another GUI which embodies systems and methods according to the invention.

FIG. 5 shows another illustrative GUI 500 for use with certain embodiments. Similar to GUI 200, GUI 500 includes name region 502, production device count region 504, Maximo ticket counts region 506, availability region 508, recovery time objective region 510, recovery time capability region 512, application maturity region 514 and rate of change region 516. Application maturity region may include inventory, status, management, risk and future regions arranged in a horizontal fashion. Application maturity region may include inventory, status, management, risk and future regions arranged in a vertical fashion, as shown in FIG. 2.

In preferred embodiments, inventory, status, management, risk and future regions are grouped together preferably at least in order to provide simplified visual access to application maturity information. Accordingly, whether grouped horizontally or vertically, these regions should preferably be grouped as a subset within the greater GUI in order to make the viewing of these regions readily discernable from the other areas in the GUI.

In addition to the these regions, GUI 500 also includes high availability region 518, data center information region 520, recovery point objective region 522, recovery exercise date region 524. A recovery exercise may preferably determine the efficacy of a fail-over operation—e.g., an operation in which a live application and/or live system fails and there exists a requirement to switch over to a back-up application and/or system.

High availability region 518 may include such evaluations that evaluate the availability of the application. The evaluations may be expressed in terminology such as Hot/Hot, Hot/Warm, Hot/Cold, Single Point of Failure ("SPF") or in any other suitable terminology. In certain embodiments, a Hot/Hot score may place an application in tier 0, a Hot/ Warm score may place an application in tier 1-5; and a Hot/Cold score may place an application in tier 6.

Table 12 (below) describes one set of exemplary characteristics that correspond to the terminology set forth above.

TABLE 12

High Availability Terminology

| Terminology (Live system/ Back-up System | Characteristics |
|---|---|
| Hot/Hot | Both the live system and the back-up system are "hot" - i.e., active and available. If the live system fails then the back-up system is available for immediate use. There is preferably zero data loss associated with a fail-over from the live system to the back-up system. Accordingly, the systems may implement synchronous replication of the data. |
| Hot/Warm | The live system is active and the back-up system is passive but available for near immediate use. Accordingly, if the live system fails, the recovery time may be limited to between about 15 seconds and one hour. The relationship between the live system and the back-up system may be characterized as continuously asynchronous whereby the back-up system is on, but not operative at the level of availability of the live system. |
| Hot/Cold | The live system is active and available. The back-up system is currently inactive and may require manual intervention to become active. |
| SPF | Single Point of Failure - No back-up system. |

In some embodiments, change calculations may include a minimum monthly change, which may be equal to the month with the least number of changes during a rolling 12 month window; an average monthly change, which may include the average monthly change over a 12 month window, or over some other suitable time period; and a maximum monthly change which may include a month with the most number of changes over a 12 month window.

Data center information region 520 may include evaluations that characterize systems as production systems (for use as an active system), disaster recovery ("DR") systems (for use as a back-up system or contingency system), non-production systems (for use as a testing environment which may include testing for system integration, component testing, user acceptance testing) and/or any other suitable systems.

Recovery point objective region 522 may include a date which represents a maximum RTO capability of the current technology platform and processes (with appropriate investment and change).

Recovery exercise date region 524 represents a region that may preferably include information directed to the last time a recovery exercise was performed on the application.

Such a recovery exercise may include one or more processes. Such processes may include various process steps. The steps may be implemented by a system. The steps may be one or more steps that can be implemented preferably following a catastrophic event such as an unplanned system shutdown.

One or more of such steps, the implementation of which is preferably sufficient for recovering from a catastrophic event, may preferably be tested. Such a test may be scheduled to occur periodically or at some other suitable interval. Recovery exercise date region 524 preferably displays the date of last occurrence of such a recovery exercise.

In certain embodiments, if recovery exercise date region 524 shows a date that is greater than a threshold amount of time, such as one year, then the system and/or a processor within the system, may trigger a response. Such a response may be that a processor may cause a color, such as red, to be displayed in region 524.

The threshold amount of time may correspond to a set of steps that can be implemented. Such steps may include running a recovery exercise to simulate the system's reaction to a catastrophic event. Such steps may include performing a fail-over to determine the extent of the system's capacity for remediation of a catastrophic event. Such steps may include updating software, running patches and/or updating hardware.

In certain embodiments of the invention, the amount of time represented by the threshold may be dynamic. For example, the threshold may vary as to whether certain industry-wide events related to the application have occurred. For example, if the application relates to an electronic trading system, and one or more trading system failures have occurred within a pre-determined, preferably rolling, period of time, such as six (6) months, then the threshold for displaying a red color in the exercise date region may decrease.

In certain embodiments, if recovery exercise date region 524 shows a date that is within a first pre-determined window of time, then the system may show a color such as green in region 524. If recovery exercise date region 524 shows a date that is within a second pre-determined window of time, then the system may show a color such as yellow in region 524. The second pre-determined window of time may correspond to a set of steps that can be implemented. Such steps may include running a recovery exercise to simulate and/or test the system's reaction to a catastrophic event and/or remediation based thereupon.

If recovery exercise date region 524 shows a date that is within a third pre-determined window of time, then the system may show a color such as red in region 524. The third pre-determined window of time may correspond to a set of steps that can be implemented. Such steps may include running a recovery exercise, updating software, running patches and/or updating hardware.

In certain embodiments of the invention an algorithm to determine the sizes of each of the pre-determined windows of time that may be implemented. Such an algorithm may preferably base determinations on historic catastrophic event information, historic recovery time information, criticality of the application and/or any other suitable information.

Once one or more of the previously-mentioned data reports (the CARs report, the DI report, the incident report, the ad hoc report and/or the business continuity extract report) have been uploaded, an illustrative GUI, such as, for example, GUI 500, may be generated.

Figure 6:
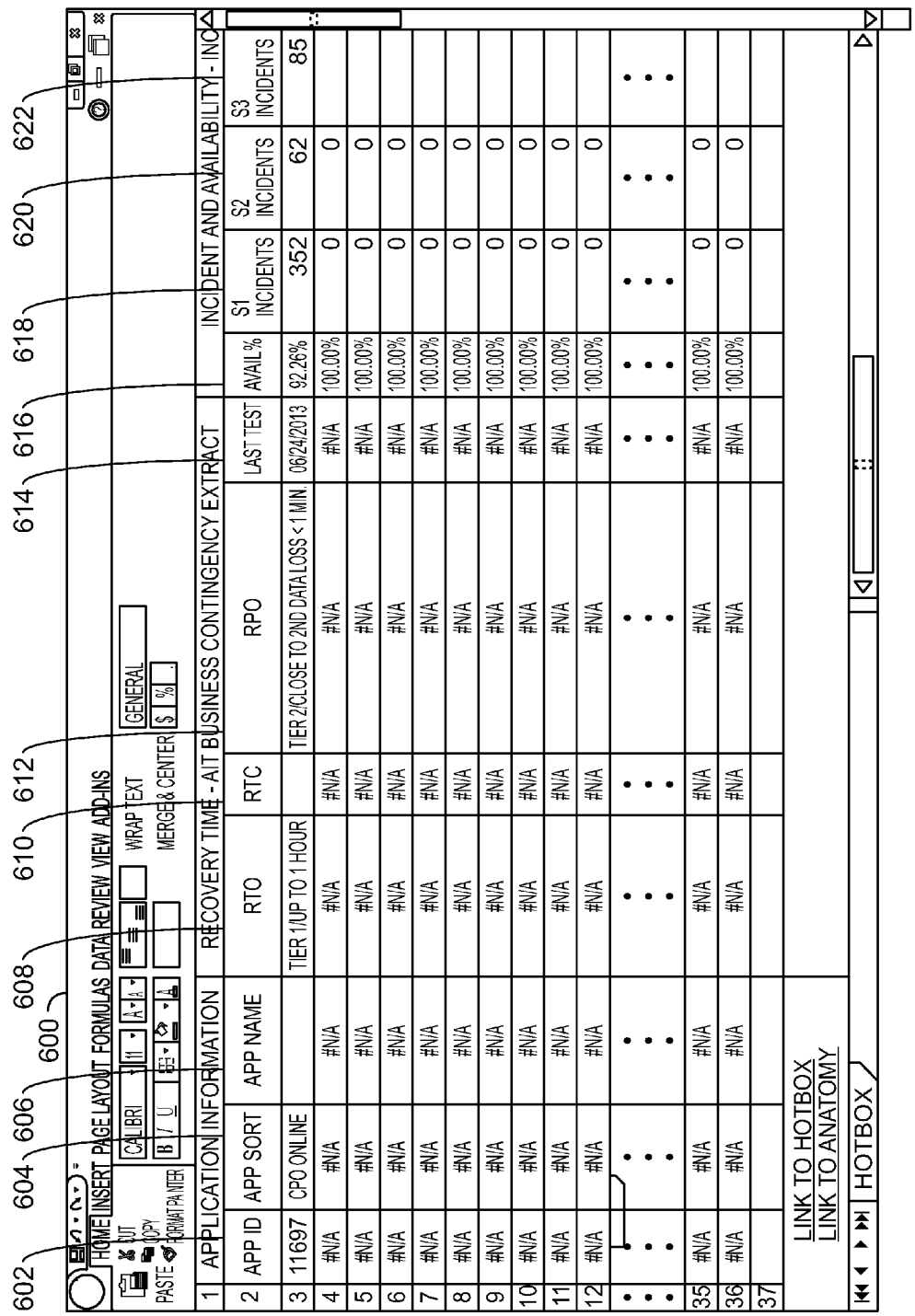
FIG. 6 shows a spreadsheet that includes data that may be used for populating a GUI such as the GUI shown in FIG. 2 and/or FIG. 5.

FIG. 6 shows a spreadsheet 600 for generating a GUI according to certain embodiments. A GUI may be generated by first entering application identification numbers for the desired application(s) in column 602. Preferably, all the data from the reports may be retrieved and calculated as needed for population of the application report column 604, application name column 606, RTO 608, RTC 610, RPO 612, last test 614, availability percentage 616, S1 (severity level 1) incidents 618, S2 (severity level 2) incidents 620, S3 (severity level 3) incidents 622 and other suitable columns (not shown).

FIG. 7 shows an application identification number region for displaying an application identification number 702. GUI 704 shows an exemplary GUI with the various information that corresponds to application number 702. Such information is preferably retrieved from a set of spreadsheets similar to spreadsheet 600.

Thus, methods and apparatus for an application maturity illustration system with recovery exercise date display and analytics in accordance with the systems and methods of the invention have been provided. Persons skilled in the art will appreciate that the present invention can be practiced in embodiments other than the described embodiments, which are presented for purposes of illustration rather than of limitation, and that the present invention is limited only by the claims that follow.

What is claimed is:

1. An article of manufacture comprising a non-transitory computer usable medium having computer readable program code embodied therein, the code when executed by a processor causes a computer to assess the maturity of a computer application, the computer readable program code in said article comprising:
    computer readable program code, when executed by the processor, determines a maturity of a computer application, said maturity determination comprising:
        an inventory score reflective of the number of computer applications that are presently in use by an entity;
        an operational status score of the computer application;
        a management score for the computer application;
        a risk score for the computer application, said risk score reflective of a risk to the entity associated with the computer application; and
        a future score for the computer application, said future score reflective of a projected relative importance of the computer application;
        a last date upon which a recovery exercise was performed for the computer application; and
    computer readable program code, when executed by the processor, displays a graphical user interface ("GUI") that includes said inventory score, said operational status score, said management score, said risk score and said future score, and wherein said GUI is further configured to display a recovery exercise date region, said recovery exercise date region that comprises information that includes a last date upon which a recovery exercise was performed on the computer application, and wherein the color of the recovery exercise date region is based, at least in part, on whether the last date displayed in the exercise date region is before or after a threshold exercise date.

2. The article of claim 1, wherein the threshold exercise date is a rolling date.

3. The article of claim 2, wherein the threshold exercise date is defined as one year prior to the generation of the GUI.

4. The article of claim 1, wherein the threshold exercise date is a first exercise date, and the color of the recovery exercise date region is based on whether the date displayed in the exercise date region is before or after the first threshold exercise date and/or before or after a second threshold exercise date, wherein when the last date is later in time than the first threshold exercise date, the recovery exercise date region is green, when the last date is earlier in time than the first threshold exercise date but later in time than the second threshold exercise date, the recovery exercise date region is yellow, and when the last date is earlier in time than the second threshold exercise date, the recovery exercise date region is red.

5. The article of claim 4, Wherein the color of the recovery exercise date region is determined based on a pre-determined protocol, said protocol for governing a recovery exercise situation, such that, when the color is green, no recovery actions are implemented, when the color is yellow, a first level of recover exercise actions are implemented, and when the color is red a second level of recovery exercise actions are implemented.

6. The article of claim 5, wherein the first level corresponds to at least one of downloading software patches for the application, reconfiguring hardware patches tier the application and compiling an updated version of the application.

7. The article of claim 5, wherein the second level corresponds to implementing a full-scale recovery exercise.

8. The article of claim 1, wherein at least one of the inventory score, the status score, the management score, the risk score and the future score is color-coded such that the display of said at least one of the inventory score, the status score, the management score, the risk score and the future score changes color depends, at least in part, on the score recorded therein.

9. Apparatus for assessing the maturity of a computer application, the apparatus comprising:
   a receiver configured to receive;
      an inventory score reflective of the number of computer applications that are presently in use by an entity;
      an operational status score of the computer application;
      a management score for the computer application, said management score reflective of a ratio of an actual management value to a desired management value;
      a risk score for the computer application, said risk score reflective of a risk to the entity associated with the computer application; and
      a future score for the computer application, said future score reflective of a projected relative importance of the computer application;
      a last date upon which a recovery exercise was performed for the computer application; and
   a processor configured to determine, based on the inventory score, the operational status score, the management score, the risk score and the future score, the maturity of the computer application and to cause a graphic user interface ("GUI") to be displayed that includes said inventory score, said operational status score, said management score, said risk score and said future score, and wherein said GUI is further configured to display a recovery exercise date region, said recovery exercise date region that comprises information that includes a last date upon which a recovery exercise was performed on the computer application, and wherein a color of the recovery exercise date region is based on whether the last date displayed in the exercise date region is before or after a threshold exercise date.

10. The apparatus of claim 9, wherein the threshold exercise date is a rolling date.

11. The apparatus of claim 10, wherein the threshold exercise date is defined to be one year prior to the generation of the GUI.

12. The apparatus of claim 10, wherein the threshold exercise date is a first exercise date, and the color of the recovery exercise date region is based on whether the date displayed in the exercise date region is before or after the first threshold exercise date and/or before or after a second threshold exercise date, wherein when the last date is later in time than the first threshold exercise date, the recovery exercise date region is green, when the last date is earlier in time than the first threshold exercise date but later in time than the second exercise date, the recovery exercise date region is yellow, and when the last date is earlier in time than the second threshold exercise date, the recovery exercise date region is red.

13. The apparatus of claim 12, wherein the color of the recovery exercise date region corresponds to a pre-determined protocol for governing a recovery exercise situation, such that, when the color is green, no recovery actions are implemented, when the color is yellow, a first level of recover exercise actions are implemented, and when the color is red a second level of recovery exercise actions are implemented.

14. The apparatus of claim 13, wherein the first level of recover exercise actions corresponds to at least one of downloading software patches for the application, reconfiguring hardware patches for the application and compiling an updated version of the application.

15. The apparatus of claim 13, wherein the second level of recovery exercise actions corresponds to implementing a full-scale recovery exercise.

16. The apparatus of claim 10, wherein at least one of the inventory' score, the status score, the management score, the risk score and the future score is color-coded such that the display of the at least one the inventory score, the status score, the management score, the risk score and the future score changes color dependant, at least in part, on the score recorded therein.

\* \* \* \* \*